(12) United States Patent
Bennett

(10) Patent No.: US 10,645,213 B1
(45) Date of Patent: May 5, 2020

(54) VIRTUAL NUMBERS FOR INTELLIGENCE OPERATIONS

(71) Applicant: World Emergency Network—Nevada, Ltd., Carson City, NV (US)

(72) Inventor: Christopher Ryan Bennett, St. Petersburg, FL (US)

(73) Assignee: World Emergency Network—Nevada Ltd., Carson City, NV (US)

( * ) Notice: Subject to any disclaimer, the term of this patent is extended or adjusted under 35 U.S.C. 154(b) by 532 days.

(21) Appl. No.: 15/472,001

(22) Filed: Mar. 28, 2017

Related U.S. Application Data

(60) Provisional application No. 62/315,500, filed on Mar. 30, 2016.

(51) Int. Cl.
*H04M 3/22* (2006.01)
*H04M 1/725* (2006.01)
*H04W 4/16* (2009.01)

(52) U.S. Cl.
CPC ..... *H04M 3/2281* (2013.01); *H04M 1/72597* (2013.01); *H04W 4/16* (2013.01);
(Continued)

(58) Field of Classification Search
None
See application file for complete search history.

(56) References Cited

U.S. PATENT DOCUMENTS 5,734,659 A 3/1998 Mann et al.
5,974,309 A 10/1999 Foti
(Continued)

FOREIGN PATENT DOCUMENTS

CN 1852466 10/2006
CN 1917456 A 2/2007
(Continued)

OTHER PUBLICATIONS

Supplementary European Search Report for European Patent Application No. EP 12805395, dated May 11, 2015, 7 Pages.
(Continued)

*Primary Examiner* — Antim G Shah
(74) *Attorney, Agent, or Firm* — Fenwick & West LLP

(57) ABSTRACT

Systems, methods, and computer readable storage mediums are configured for implementing virtual numbers (VN) for intelligence operations involving source-handler communications in support of an agency. Example embodiments implementing virtual numbers eschew the requirement of the agency to maintain and configure dedicated hardware switches that contain SIM card pairs to manage the transfer of source-handler calls in a compliant fashion. Rather than maintaining physical SIMs for each handler and each source with dedicated hardware, each source and each handler are assigned a virtual number for communicating in a compliant fashion. A source communicates with the handler through the handler VN and the hander communicates with the source through the source VN, and communications completed through the VNs are logged for compliance. Communications between a handler and a source may be permitted only when an association of their VNs exists in a mapping table to prevent unauthorized contact through the VNs.

17 Claims, 8 Drawing Sheets

(52) U.S. Cl.
CPC .............. *H04Q 2213/13399* (2013.01); *H04Q 2213/399* (2013.01)

(56) References Cited

U.S. PATENT DOCUMENTS

| | | |
|---|---|---|
| 6,301,246 B1 | 10/2001 | Shaffer et al. |
| 6,356,630 B1 | 3/2002 | Cai et al. |
| 6,400,807 B1 | 6/2002 | Hewitt et al. |
| 6,449,474 B1 | 9/2002 | Mukherjee et al. |
| 6,553,025 B1 | 4/2003 | Kung et al. |
| 7,181,017 B1 | 2/2007 | Nagel et al. |
| 7,194,256 B2 | 3/2007 | Lee |
| 7,626,980 B1 | 12/2009 | Croak et al. |
| 7,839,987 B1 | 11/2010 | Kirchhoff et al. |
| 7,873,349 B1 | 1/2011 | Smith et al. |
| 8,150,368 B2 | 4/2012 | Koch et al. |
| 8,265,597 B2 | 9/2012 | Smith et al. |
| 8,824,652 B2 | 9/2014 | Bennett |
| 8,989,371 B2 * | 3/2015 | Kaufman .......... H04M 3/42008 370/356 |
| 2001/0016037 A1 | 8/2001 | Fritzinger et al. |
| 2001/0019604 A1 | 9/2001 | Joyce et al. |
| 2001/0036821 A1 | 11/2001 | Gainsboro et al. |
| 2002/0061100 A1 | 5/2002 | DiCamillo et al. |
| 2002/0132638 A1 | 9/2002 | Plahte et al. |
| 2002/0181460 A1 | 12/2002 | Strathmeyer et al. |
| 2002/0198007 A1 | 12/2002 | Zimmerman |
| 2003/0078041 A1 | 4/2003 | Dikmen et al. |
| 2003/0144024 A1 | 7/2003 | Luo |
| 2003/0215069 A1 | 11/2003 | Hitzeman |
| 2004/0110465 A1 | 6/2004 | Bedingfield et al. |
| 2004/0151288 A1 | 8/2004 | Lee |
| 2004/0152442 A1 | 8/2004 | Taisto et al. |
| 2004/0165709 A1 | 8/2004 | Pence et al. |
| 2004/0208307 A1 | 10/2004 | Walker et al. |
| 2004/0240439 A1 | 12/2004 | Castleberry et al. |
| 2005/0074104 A1 | 4/2005 | Swartz |
| 2005/0094773 A1 | 5/2005 | Peterson |
| 2005/0111629 A1 | 5/2005 | Carlson et al. |
| 2005/0175165 A1 | 8/2005 | Holder |
| 2005/0180395 A1 | 8/2005 | Moore et al. |
| 2005/0232253 A1 | 10/2005 | Ying et al. |
| 2005/0277407 A1 | 12/2005 | Ahn et al. |
| 2006/0034426 A1 | 2/2006 | Freudenberger et al. |
| 2006/0140200 A1 | 6/2006 | Black et al. |
| 2006/0147012 A1 | 7/2006 | Moody et al. |
| 2006/0291638 A1 | 12/2006 | Radziewicz et al. |
| 2007/0019618 A1 | 1/2007 | Shaffer et al. |
| 2007/0036127 A1 | 2/2007 | Roosen et al. |
| 2007/0041550 A1 | 2/2007 | McLarty et al. |
| 2007/0105531 A1 | 5/2007 | Schroeder |
| 2007/0161412 A1 | 7/2007 | Nevid et al. |
| 2007/0183403 A1 | 8/2007 | Somers |
| 2007/0217437 A1 | 9/2007 | Forte |
| 2008/0008105 A1 | 1/2008 | Black et al. |
| 2008/0045186 A1 | 2/2008 | Black et al. |
| 2008/0198978 A1 | 8/2008 | Olligschlaeger |
| 2008/0205626 A1 | 8/2008 | Mandalia et al. |
| 2008/0215725 A1 | 9/2008 | Backer et al. |
| 2008/0242271 A1 | 10/2008 | Schmidt et al. |
| 2009/0061872 A1 | 3/2009 | Hicks |
| 2009/0074156 A1 | 3/2009 | Ku et al. |
| 2009/0141883 A1 | 6/2009 | Bastien |
| 2009/0214008 A1 | 8/2009 | Mani |
| 2010/0128857 A1 | 5/2010 | Logan |
| 2010/0161683 A1 | 6/2010 | Leeds et al. |
| 2010/0173605 A1 | 7/2010 | Moraes |
| 2010/0189228 A1 | 7/2010 | Seyfetdinov |
| 2010/0220843 A1 | 9/2010 | Bosan et al. |
| 2011/0002480 A1 | 1/2011 | Smith et al. |
| 2011/0081009 A1 | 4/2011 | Ma et al. |
| 2011/0164734 A1 | 7/2011 | Clark et al. |
| 2013/0003942 A1 | 1/2013 | Bennett |
| 2013/0208878 A1 | 8/2013 | Bennett |
| 2013/0223288 A1 | 8/2013 | Karnalkar et al. |
| 2013/0303151 A1 | 11/2013 | Johnson |
| 2014/0080473 A1 | 3/2014 | Bennett |
| 2014/0194101 A1 | 7/2014 | Mullen et al. |
| 2014/0302835 A1 | 10/2014 | Henderson et al. |
| 2015/0365520 A1* | 12/2015 | Bennett ............... H04M 3/2281 455/417 |

FOREIGN PATENT DOCUMENTS

| | | |
|---|---|---|
| CN | 101112053 A | 1/2008 |
| CN | 201039280 Y | 3/2008 |
| EP | 1835691 | 9/2007 |
| GB | 2456754 | 7/2009 |
| JP | 2001-237965 | 8/2001 |
| JP | 2001-268230 | 9/2001 |
| JP | 2007-166089 | 6/2007 |
| JP | 2009-071603 | 4/2009 |
| JP | 2009-260492 | 11/2009 |
| RU | 2221345 C2 | 1/2004 |
| WO | WO 2001/50682 | 7/2001 |
| WO | WO 2005/031544 A2 | 4/2005 |
| WO | WO 2011/129420 | 10/2011 |
| WO | WO 2013/003779 A1 | 1/2013 |
| WO | WO 2013/056156 | 4/2013 |

OTHER PUBLICATIONS

Extended Search Report for European Patent Application No. EP 14769627.2, dated Nov. 4, 2016, 5 Pages.
European Supplementary Search Report for EP Application No. 12840210.4, dated Feb. 16, 2015, 6 pages.
First Office Action for Chinese Application No. 201280039587.6, dated Aug. 1, 2014, 25 pages.
Second Office Action for Chinese Patent Application No. CN 201280039587.6, dated Jun. 30, 2015, 10 Pages.
Third Office Action for Chinese Patent Application No. 201280039587. 6, dated Mar. 8, 2016, 9 Pages.
Fourth Office Action for Chinese Patent Application No. CN 201280036618.2, dated Jun. 3, 2016, 17 Pages.
Fifth Office Action for Chinese Patent Application No. CN 201280036618.2, dated Dec. 5, 2016, 19 Pages.
Office Action for U.S. Appl. No. 13/839,388, dated Dec. 4, 2014, 16 pages.
Office Action for U.S. Appl. No. 13/839,388, dated Sep. 23, 2016, 14 Pages.
Office Action for U.S. Appl. No. 14/537,619, dated Jan. 16, 2015, 12 pages.
Examination Report for Canadian Patent Application No. CA-2,850,524, dated May 4, 2015, 5 Pages.
Office Action for Canadian Patent Application No. CA 2,839,952, dated Sep. 12, 2016, 3 Pages.
Examination Report for Canadian Patent Application No. CA-2,839,952, dated Jul. 13, 2015, 4 Pages.
Russian Office Action, Russian Application No. 2014102971/07(004560), dated Mar. 17, 2015, 11 pages.
Office Action for Russian Patent Application No. 2014118569/07(029296), dated Mar. 24, 2015, 6 Pages.
1.sup.st Office Action for Mexican Patent Application No. MX 14/000151, dated Feb. 12, 2015, 5 Pages.
1.sup.st Office Action for Mexican Patent Application No. MX 13/013965, dated Feb. 20, 2015, 3 Pages.
Office Action for Mexican Patent Application No. MX 14/004373, dated Mar. 2, 2015, 3 Pages.
Office Action for Mexican Patent Application No. MX 15/013841, dated Mar. 8, 2016, 3 Pages.
Office Action for Japanese Patent Application No. JP 2014-535957, dated Oct. 4, 2016, 6 Pages.
Office Action for Japanese Patent Application No. JP 2014-519176, dated Apr. 12, 2016, 4 Pages.
Examination Report No. 1 for Australian Patent Application No. 2012275151, dated May 2, 2016, 3 Pages.
Examination Report No. 2 for Australian Patent Application No. 2012275151, dated Jul. 27, 2016, 4 Pages.

(56) References Cited

OTHER PUBLICATIONS

PCT International Search Report and Written Opinion for PCT/US15/36030, dated Sep. 11, 2015, 14 Pages.
Patent Cooperation Treaty, International Search Report and Written Opinion, International Patent Application No. PCT/US2012/060102, dated Jan. 11, 2013, 14 pages.
Patent Cooperation Treaty, International Search Report and Written Opinion, International Patent Application No. PCT/US2012/045052, dated Sep. 25, 2012, 16 pages.
PCT International Search Report and Written Opinion for PCT/US2014/026240, dated Sep. 19, 2014, 11 Pages.
PCT International Search Report and Written Opinion for PCT/US17/24593, dated Jun. 15, 2017, 13 Pages.
National Intellectual Property Administration, First Office Action, Chinese Patent Application No. 2012/80057427.4, dated Apr. 28, 2016, 12 pages.

* cited by examiner

VIRTUAL NUMBERS FOR INTELLIGENCE OPERATIONS

CROSS-REFERENCE TO RELATED APPLICATIONS

This application claims the benefit of U.S. Provisional Application No. 62/315,500, filed on Mar. 30, 2016, which is incorporated by reference herein in its entirety.

TECHNICAL FIELD

The present disclosure generally relates to the field of undercover operations and more specifically to managing source and handler communications.

BACKGROUND

Human intelligence sources are a significant information gathering asset for many countries. Sources provide intelligence information that aids government agencies in domestic and international investigations. Intelligence from sources is often critical to government agencies tasked with keeping their country safe, protecting citizens of the country, and protecting interests of the country both domestic and abroad. Handlers are government agency staff that work with sources covertly on an ongoing basis. As sources come from a wide variety of backgrounds, handlers need to build productive and trusting relationships with their sources. One of the ways handlers communicate with sources on a routine basis is through telephonic communications.

Government agencies that utilize human intelligence sources are often subject to strict legislation and governance that requires the documentation and retention of communication data between sources and agency handlers. Additionally, access to retained source-handler communications is often necessary by the handler, any co-handler also assigned to the source, and administrators that permit handler-source communications and coordinate operations based on information received from sources. Further, retained communications are often addressed in relation to government oversight reviews and proceedings.

As communications between sources and handlers are often subject to strict legal requirements, handlers must follow rigorous agency procedures to ensure compliance during the course of their work. As such, handlers spend a significant portion of their time making sure their work with sources complies with the laws governing their interactions with sources and completing related paperwork. Additionally, agency administrators spend a significant portion of agency budget on purchasing and maintaining dedicated hardware to ensure telephonic communications between sources and handlers comply with legal requirements. Aside from cost concerns, the dedicated hardware does not scale to allow on-demand compliance with legal requirements when additional sources are recruited. Lastly, administrative agency personnel must take time out of their day to procure and configure additional dedicated hardware.

BRIEF DESCRIPTION OF THE DRAWINGS

The disclosed embodiments have other advantages and features that will be more readily apparent from the detailed description, the appended claims, and the accompanying figures (or drawings). A brief introduction of the figures is below.

Figure (FIG. 1A is a block diagram illustrating an example environment for implementing virtual numbers for intelligence operations according to one example embodiment.

DETAILED DESCRIPTION

Figure 1A:
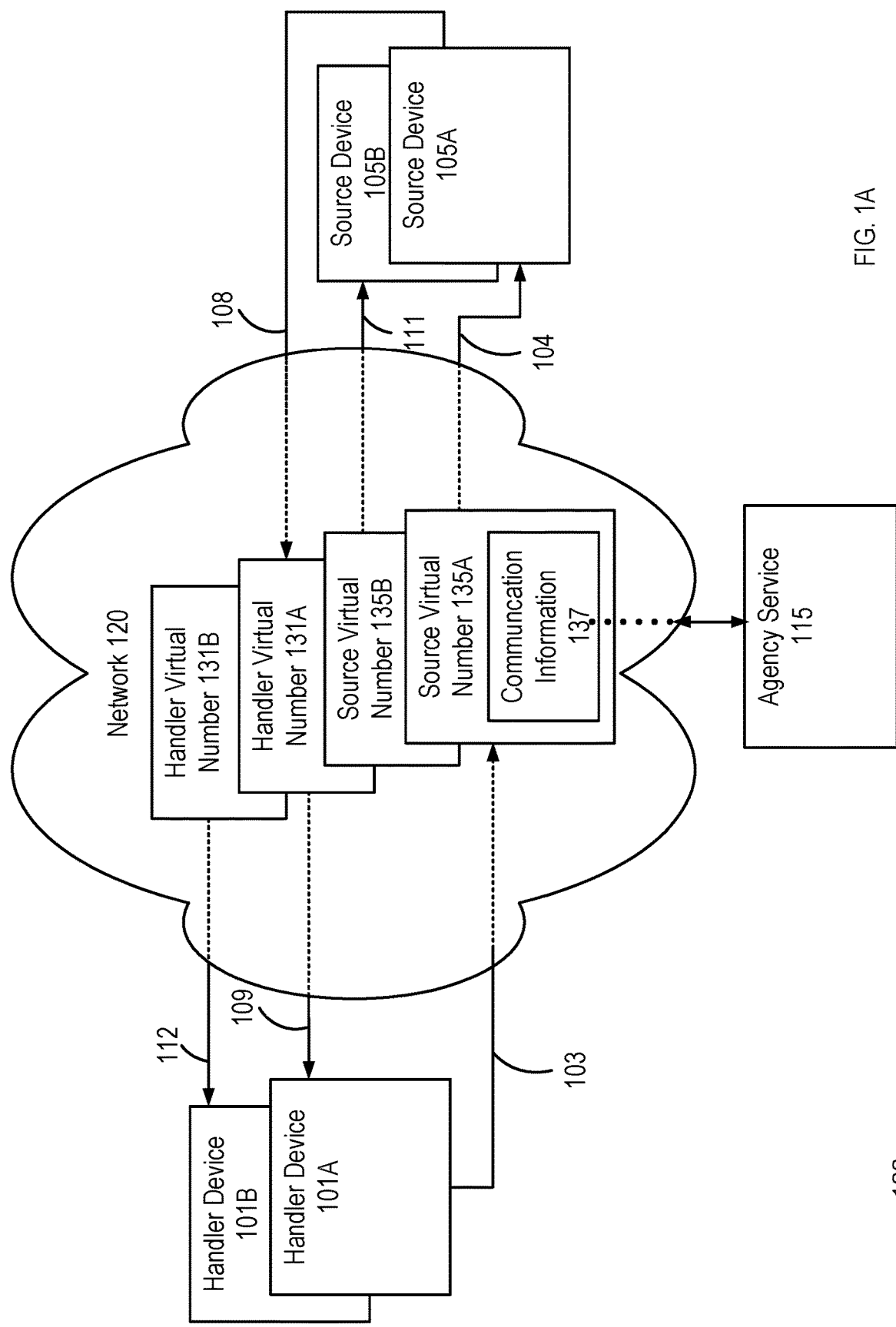
FIG. 1B is a block diagram illustrating an example operating environment of an agency service implementing virtual numbers for intelligence operations in support of an agency according to one example embodiment.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Currently, in order to comply with legal requirements governing communications between sources and handlers, or source-handler communications, dedicated hardware is implemented at government agencies that utilize human intelligence sources. The dedicated hardware is a switching device into which several subscriber identity module (SIM) cards are inserted. For example, the hardware switching device may contain multiple slots for receiving a SIM card corresponding to each source and each handler, up to a certain number of sources and handlers. For example, the hardware switch may contain 16 slots to support 8 source-handler pairs. Source-handler pairings are linked through the configuration of modem commands such that the hardware switching device transfer calls between the SIMs corresponding to the source and handler in a given pairing. Thus, for example, an incoming call at a source SIM from a source device is switched in the hardware switching device to route the call to a handler SIM in order to reach a handler device. In such configurations, each SIM can only provide a one directional transfer, thus requiring the use of a pair of SIMs for each source-handler pair. Each SIM implemented incurs incremental costs to the agency because the agency must maintain an account with a wireless provider that provides network access on an individual SIM basis. Further, each SIM must be manually configured to permit access to the provider network. These costly and time consuming requirements for implementing a hardware switching device with SIMs are compounded by the fact that SIMs from a variety of providers may be required to route calls. For example, an agency may maintain at least one SIM pair from each of the major wireless providers operating within their areas of operations. Accordingly, administrative agency personnel must manage accounts with multiple SIMs (e.g., lines) on multiple wireless providers, in addition to maintaining the dedicated hardware switch to route calls between SIM pairs to complete telephonic communications between sources and handlers.

In addition to the above limitations for implementing SIM pairs with dedicated hardware, the agency must procure and configure additional dedicated hardware switches every time the capacity (e.g., 8 SIM pairs) of a given dedicated hardware switch is reached in order add an additional handler-source SIM pair. Further, each hardware switch requires a cable connection to, in most instances, an additional dedicated computing device configured to store call logs locally, which are then reviewed and processed manually at the computing device prior to backup for record retention. Lastly, the recording of call and voicemail audio must be configured through the dedicated hardware when permitted and again disabled when not permitted. These shortcomings in current systems for enabling source-handler communications, in addition to poor management of recorded audio, let alone source-handler communications on messaging services and voicemail, barely meet the necessary compliance measures that permit source-handler communications and handicap handlers, sources, and oversight alike.

A system (and method, and computer readable storage medium storing computer program instructions) may be configured for implementing virtual numbers for intelligence operations in support of an agency. Example embodiments described herein implementing virtual numbers overcome the limitations of dedicated hardware switches, as well as provide additional benefits in logging source-hander communications such as audio communication and messaging communications (e.g., text messages (SMS) and multimedia messages (MMS), etc.). Example embodiments may be implemented over wired and wireless radio networks (e.g., PSTN, Cellular Network and/or WiFi) for network capable devices, such as a mobile phone, or land line phone capable of telephonic communications (e.g., call and/or text). Example embodiments of methods and systems implementing virtual numbers for intelligence operations eschew the requirement for an agency to maintain and configure dedicated hardware switches that contain SIM card pairs to manage the transfer of source-handler calls in a compliant fashion. Rather than maintaining physical SIMs for each handler and each source, associated accounts with cellular providers, hardware switches for transferring calls between physical SIM pairs, and dedicated computer hardware for recording call audio each source and each handler are assigned a virtual number for communicating with each other. In one embodiment, an agency service receives a request to provision one or more virtual numbers for establishing source-handler communications. For example, an agency may request a first virtual number for a source and a second virtual number for a handler. The agency service provisions the virtual numbers from a provider. The agency may further specify assignment of a virtual number to a source or handler by providing information corresponding to the source or handler. In some embodiments, the assignment may be effected through associations in a mapping table. In one embodiment, a source device number (e.g., transmitting number of the source's device) is mapped to a virtual number provisioned for the source (e.g., source VN), thus forming an association between the source VN and a source device. Similarly, a handler device number (e.g., transmitting number of the handler's device) is mapped to a virtual number provisioned for the handler (e.g., handler VN), thus forming an association between the handler VN and a handler device. To permit a given handler to communicate with a given source and vice versa, the source VN (mapped to the source device) and handler VN (mapped to the handler device) are mapped to each other, thus forming an association between the source VN and handler VN for a source-handler pair. In some embodiments, these associations are stored in a mapping table which may be consulted to route communications between sources and handlers that are permitted to communicate with each other as indicated by a source-handler pairing. Additionally, source and/or handler identification information may be stored in the mapping table in association with a corresponding virtual number. In some example embodiments, the source/handler identification information is utilized for caller identification information.

In an example embodiment, a telephonic device (e.g., a source device or handler device) initiates a communication to a virtual number (e.g., a handler VN or source VN). The initiated communication to the virtual number is identified (e.g., by the provider of the virtual number) as directed to one of the virtual numbers provisioned by the agency service and, in turn, information associated with the communication is received at the agency service (e.g., from the provider). For example, if the telephonic device initiates a call to the virtual number, device information such as a transmitting number corresponding to the telephonic device (initiator or caller) and the virtual number (recipient) are received by the agency service. For a message communication, device information such as a transmitting number corresponding to the telephonic device (initiator or sender) and the virtual number (recipient), and optionally message content, are received by the agency service. The received information associated with the communication is checked against the mapping table (e.g., by the agency service). The result of the check indicates whether the initiated communication is permitted (or should be denied) and how the initiated communication, if permitted, should be completed.

In an example embodiment, if a telephonic device (e.g., a source device) initiates a communication to a virtual number (e.g., a handler VN to communicate with a handler), the agency service receives (e.g., from a provider) communication information such as device information (e.g., a number) of the telephonic device and the virtual number. The agency service checks the virtual number against the mapping table, which identifies the virtual number as the handler VN based on a match of the virtual number to the handler VN stored in the mapping table. Thus, the agency service determines that the initiated communication is destined for a given handler. In turn, the agency service may identify a handler device of the handler based on an association of the handler VN with a transmitting number of the handler device in the mapping table. The agency service checks the transmitting number of the telephonic device against the mapping table, which identifies the telephonic device as the source device based on a match of the transmitting number of the telephonic device to the transmitting number of the source device stored in the mapping table. Thus, the agency service determines that the initiated communication originated from a given source. In turn, the agency service may identify a source VN based on an association of the transmitting number of the source device with the source VN in the mapping table. The agency service may also identify whether a source-handler association, which permits communication between the given source (identified based on the transmitting number of the telephonic device) and the given handler (identified based on the virtual number), exists. For example, the agency service may determine whether the source-handler association exists in the mapping table. The source-handler association may be an association of the handler VN with the source VN indicating that communications are permitted between the corresponding source and handler.

In response to identifying the handler device based on the virtual number matched to the handler VN associated with the handler device and the source VN based on the telephonic device matched to the source device associated with the source VN, the agency service transmits instructions (e.g., to the provider) to complete the communication to the handler device through the source VN. In turn, the handler device receives the communication from the source VN. In this manner, the handler device (and thus the handler) does not receive the device information (e.g., the transmitting number) corresponding to the source device and the source does not require the device information (e.g., the transmitting number) corresponding to the handler device in order communicate with the handler. For example, if the initiated communication from the source device to the handler VN is a telephonic call, the handler device receives an incoming call with caller identification information corresponding to the source VN. Thus, the incoming call appears to have originated from the source VN rather than the source device. In turn, the handler may answer the incoming call on the handler device to communicate with the source. Or, for example, if the initiated communication from the source device to the handler VN is a message, the handler device receives the message with sender information corresponding to the source VN. Thus, the message appears to have originated from the source VN rather than the source device. In turn, the handler may open the received message on the handler device to view the communication from the source. Similarly, the handler may initiate a communication to the source (e.g., to call or message the source either initially or in response to a missed call or received message) through the source VN. For example, the handler may utilize the handler device to call the source VN or transmit a message to the source VN, as described below.

Specifically, in an example embodiment, if a (second) telephonic device (e.g., the handler device) initiates a communication to a (second) virtual number (e.g., the source VN to communicate with the source), the agency service receives (e.g., from the provider) communication information such as device information (e.g., a transmitting number) of the (second) telephonic device and the (second) virtual number. The agency service checks the (second) virtual number against the mapping table, which identifies the (second) virtual number as the source VN based on a match of the (second) virtual number to the source VN stored in the mapping table. Thus, the agency service determines that the initiated communication is destined for the source. In turn, the agency service may identify the source device of the source based on the association of the source VN with the transmitting number of the source device in the mapping table. The agency service checks the transmitting number of the (second) telephonic device against the mapping table, which identifies the (second) telephonic device as the handler device based on a match of the transmitting number of the (second) telephonic device to the transmitting number of the handler device stored in the mapping table. Thus, the agency service determines that the initiated communication originated from the handler. In turn, the agency service may identify the handler VN based on the association of the transmitting number of the handler device with the handler VN in the mapping table. The agency service may also identify whether the source-handler association, which permits communication between the source (identified based on the virtual number) and the handler (identified based on the transmitting number of the telephonic device), exists. For example, the agency service may determine whether the source-handler association exists in the mapping table. The source-handler association may be an association of the handler VN with the source VN indicating that communications are permitted between the corresponding source and handler.

In response to identifying the source device based on the (second) virtual number matched to the source VN associated with the source device and the handler VN based on the (second) telephonic device matched to the handler device associated with the handler VN, the agency service transmits instructions (e.g., to the provider) to complete the communication to the source device through the handler VN. In turn, the source device receives the communication from the handler VN. In this manner, the source device (and thus the source) does not receive the device information (e.g., the transmitting number) corresponding to the handler device and the handler does not require the device information (e.g., the transmitting number) corresponding to the source device in order communicate with the source. For example, if the initiated communication from the handler device to the source VN is a telephonic call, the source device receives an incoming call with caller identification information corresponding to the handler VN. Thus, the incoming call appears to have originated from the handler VN rather than the handler device. In turn, the source may answer the incoming call on the source device to communicate with the handler. Or, for example, if the initiated communication from the handler device to the source VN is a message, the source device receives the message with sender information corresponding to the handler VN. Thus, the message appears to have originated from the handler VN rather than the handler device. In turn, the source may open the received message on the source device to view the communication from the handler.

Thus, through the example methods and systems, the handler and the source may communicate with each other through the source VN and handler VN, respectively, without exchanging device information. For example, an administrator overseeing handler-source communications may obtain mapping information for the mapping table, including the device information corresponding to the handler device and the device information corresponding to the source device, such that neither the source nor the handler has knowledge of device information for the other party. In this manner, the administrator may restrict the source and the handler from communicating outside the virtual number system (e.g., to maintain compliance). Further, the administrator may configure associations in the mapping table such that only permitted source-handler communications are completed.

For example, the agency service may determine whether the mapping table indicates that communication between the source and the handler are permitted prior to completing a communication. The mapping table may indicate communication between the source and the handler is permitted based on an association between the source and the handler. For example, the source VN, the source device (e.g., the transmitting number of the source device), or pairing thereof may be associated with the handler VN, the handler device (e.g., the transmitting number of the handler device), or pairing thereof in the mapping table to indicate communication between the source and the handler is permitted. If the communication between the source and the handler is permitted, the agency service may complete the communication as described above. If the communication is not permitted (e.g., no source-handler association exists in the mapping table), the agency service denies the communication. For example, in the case of a message communication, the agency service may deny the communication by discarding the message, instructing the provider to discard the message, or instructing the provider to transmit a pre-configured response to the message (e.g., this number is not capable of receiving messages at this time, or other). Or, for example, in the case of a telephonic call communication, the agency service may deny the communication by not instructing the provider (in which case, the line may ring indefinitely until the telephonic device hangs up), instructing the provider to disconnect the telephonic device, or instructing the provider to play a busy/disconnected tone until the telephonic device having initiated the telephonic communication hangs up.

In some embodiments, in addition to communication information received when a communication is initiated (e.g., initiating sender/caller information and recipient information) and/or determined for the communication (e.g., time stamp), the agency service receives information about completed communications (e.g., from the provider). For a completed telephonic call communication, for example, the agency service may receive completed communication information such as call audio (if any), a voicemail recording (if any), transcript thereof (if any), call duration, etc. For a completed message communication, for example, the agency service may receive completed communication information such as a delivery receipt, delivery time stamp, and/or message content (if not already received), etc. Information received about a completed communication may be stored in association with the information received about initiated communications as an entry in a communication log. For example, the communication log may contain an entry for each communication between a source and a handler that includes the received information associated with the communication.

In some embodiments, multiple handlers may be associated with a single source in the mapping table. For example, the handler and a co-handler may work together with the source. In some embodiments, the agency service may automatically notify the co-handler (or any number thereof) when the handler and the source communicate. Similarly, the agency service may automatically notify the handler (and additional co-handlers) when the co-handler and the source communicate. The agency service may identify the handler and/or the co-handlers permitted to communicate with the source based on their association in the mapping table and transmit the notification (e.g., via a message, application push notification, and/or email) to the handler and/or the co-handlers not a party to (e.g., did not initiate or receive) the communication with the source. For example, the agency service may transmit a message including information from the entry corresponding to the communication in the communication log and optionally a link (e.g., uniform resource locator) to access the communication log via an interface. Additionally, as an administrator may monitor the communications of multiple sources with their handlers, the agency service notify an administrator associated with the source and/or handler.

In some embodiments, a handler device and/or administrator device may access a web interface, application program interface (API) and/or execute a standalone application with access to the API for viewing handler-source communication logs and/or configuring mapping table information and source-handler associations. For example, a handler may review past communications with associated sources and sources the handler is permitted to communicate with and an administrator may review communications of associated sources/handlers, configure handler-source associations in the mapping table, provision virtual numbers, and associate virtual numbers with handler/source device information.

In some embodiments, the mapping table stores source identification information for identifying a source to a handler. The agency service may transmit instructions to the provider with the source identification information such that the source is identified to the handler in order for the handler to make a decision on whether to communicate with the source. For example, the source identification information may include the name of the source and the instructions cause the provider to play an audio prompt (e.g., John Doe is calling, press 1 to talk or press 2 to send to voicemail) if the handler answers a call, prior to the establishment of audio communications between the handler and source.

Example Operating Environment

Figure (FIG. 1A is a block diagram illustrating an example environment 100 for implementing virtual numbers for intelligence operations according to one example embodiment. As shown the environment 100 includes a network 120 connecting an agency support service provider "agency service" 115, handler devices 101, and source devices 105. While only one agency service 115, two handler devices 101A, 101B, and two source devices 105A, 105B are shown in FIG. 1A for clarity, embodiments can support many handler devices, sources devices, and have multiple agency service providers 115.

Agency service 115 represents a collection of compute devices (e.g., servers) and related storage mediums that are configured for performing various activities such as configuring virtual numbers 131, 135 on the network 120 for sources and handlers, exchanging data over the network, and storing data in support of handler-source communications for one or more agencies (not shown). For example, the agency service 115 may include one or more modules providing ascribed functionality to an agency via an application programming interface ("API") or web interface, collectively "the interface", as described in more detail with reference to FIG. 1B.

The handler devices 101 and source devices 105 are oftentimes telephonic devices capable of transmitting data wired and/or wirelessly over the network 120. Some examples of an operator device 101 or source device 105 include a mobile phone, tablet or notebook computer with telephonic communicability (e.g., call and/or messaging). Example embodiments of a handler device 101 or source device 105 as a mobile phone include feature phones, smart phones or standard mobile phones. Accordingly, a given mobile phone or other device operated as a handler device 101 or source device 105 may not necessarily include or support all of the functionality ascribed herein to the handler device and/or the source device on the virtual number system due to inherent differences in device capabilities. In some embodiments, other telephonic devices such as landline phones are used with the virtual number system.

In addition, a number of administrator devices (not shown) may connect to entities on the network 120 to review data associated with the communications between one or more of the handler devices and the source devices, configure source-handler associations, and request virtual numbers for sources and handlers with the agency service 115. Depending on the embodiment, an administrator device is a network 120 capable device that can be operated within an agency or externally in the field. As referred to herein, an administrator device is a mobile or stationary device capable of connectivity (e.g., wireless or wired) to a network 120 such as an agency network, the internet, PSTN and/or cellular network. Some examples of an administrator device include a mobile phone, tablet, and notebook or desktop computer.

Example embodiments of the administrator device as a mobile phone can include feature phones, smart phones or standard mobile phones. Accordingly, a given mobile phone or other device operated as an administrator device does not necessarily include or support all of the functionality ascribed herein to the administrator device on the virtual number system due to inherent differences in device capabilities. In one example embodiment, the administrator device executes an administration module for interfacing with entities on the network 120 to manage handler-source communications and view collected data, an example of which is described in greater detail with reference to FIG. 2. In some embodiments, a handler device 101 may also execute the administration module, but may be limited to viewing collected data for only the sources with which the handler is permitted to communicate with (e.g., handler device 101A may review communication logs associated with source devices 101A and 101B while handler device 101B may review communication logs associated with source device 105B but not source device 105A).

FIG. 1A also illustrates a number of virtual numbers 131, 135 configured for use on the network 120. In one embodiment, the agency service 115 provisions and configures the virtual numbers 131, 135 on the network 120 based on information received from an agency. For example, the agency service 115 may store configuration information including associations for the virtual numbers 131, 135 in a mapping table. Additionally, the agency service 115 receives communication information 137 describing communications initiated to handled virtual numbers 135 and determines how to complete the communication to facilitate handler-source communications. Common examples of initiated communications include a device with telephonic capability (e.g., telephonic device) placing a call to and/or messaging the virtual number from a given device. The agency service 115 may also receive communication information 137, such as call duration, call audio, call transcript, message content, associated timestamps, etc., when the communication is completed.

When a communication is initiated to a virtual number, the communication information 137 includes device information for the telephonic device initiating the communication and the virtual number. For example, if handler device 101 initiates a communication 103 to source VN 135A, the communication information 137 includes device information for the handler device 101A and the source VN 135A to which the communication was initiated. For example, the communication information 137 for a call may include caller/recipient information such as a transmitting number of the handler device 101A identified in a caller field and the virtual number, Source VN 135A, identified in a recipient field. In another example, the communication information 137 for a message may include sender/recipient information such as a transmitting number of the handler device 101A in a sender field and the virtual number, Source VN 135A, in a recipient field. In some embodiments, for message communications, the agency service 115 may receive the message and parse the message to identify the sender and recipient information. Additionally, the agency service 115 may parse out message content for storage.

Based on the received device information, the agency service 115 identifies the telephonic device initiating a communication to a virtual number 131, 135 as either a source device 105 or a handler device 101. Based on the received virtual number, the agency service 115 identifies whether the virtual number is a handler VN 131 or a source VN 135. For example, the agency service 115 may store one or more associations between devices (e.g., by transmitting number) and virtual numbers such that a VN may be identified based on a transmitting number of a device and vice versa, and one or more associations between virtual numbers for source-handler communication permissions.

In one embodiment, the agency service 115 stores and configures provisioned virtual numbers in the mapping table as either a handler VN or source VN. Similarly, in one embodiment, device information for a telephonic device to be operated on the virtual number system may be stored and configured in the mapping table as either that of a hander device or source device. Thus, for example, considering the initiated communication 103, the agency service 115 identifies the telephonic device as the handler device 101A based on the received device information and identifies the virtual number as the source VN 135A based on the received virtual number. In one embodiment, the received device information includes a transmitting number of the telephonic device. Accordingly, the agency service 115 may identify the telephonic device by matching the transmitting number of the telephonic device to a transmitting number of a handler device 101 or source device 105 stored in the mapping table. Similarly, the agency service 115 may identify the virtual number as either a handler VN 131 or source VN 135 by matching the received virtual number to a handler VN or source VN stored in the mapping table.

Turning back to the initiated communication 103, the handler device 101A initiated the communication 103 to the source VN 135A and the agency service 115 identifies that the initiated communication originated from the handler device 101A and is to the source VN 135A based on a comparison of received information 137 describing the initiated communication to information stored in the mapping table. In one embodiment, the mapping table further includes associations between handler devices and handler VNs and source devices and source VNs such that the initiated communication 103 can be completed. Considering the illustration in FIG. 1A, handler device 101A is associated with handler VN 131A and source device 105A is associated with source VN 135A in the mapping table. For example, the mapping table may store device information for handler device 101A in association with handler VN 131A and store device information for source device 105A in association with source VN 135A within the mapping table. Similarly, handler device 101B may be associated with handler VN 131B and source device 101B with source VN 135B within the mapping table. In one embodiment, the device information is a transmitting number of the handler/source device. From the associations, the agency service 115 identifies the virtual number associated with the telephonic device initiating the communication and identifies the telephonic device associated with the virtual number with which the communication was initiated to from the mapping table. For initiated communication 103, for example, the agency service 115 identifies the handler VN 131A associated with handler device 101A and identifies the source device 105A associated with the source VN 135A. Thus, the agency service 115 determines that the initiated communication 103 is destined for the source device 105A and may complete the communication 104 based on the device information stored for the source device 105A in the mapping table. For example, the agency service 115 may instruct a provider of the virtual number to complete the communication 104 to the source device 105A by transmitting instructions to the provider with the transmitting number of the source device 105A.

In order to ensure that handler-source communications are performed within the virtual number system, device information for the handler device 101A should not be identified to the source device 105A when completing the communication 104. However, the source should still have a way to communicate back to the handler. As described previously, the agency service 115 may identify the handler VN 131A associated with the handler device 101A. In turn, when completing the communication 104 to the source device 105A, the communication may be completed with number information corresponding to the handler VN 131A such that completed communications received at the source device 105A appear as if they originated from the handler VN 131A rather than the handler device 131A. In one embodiment, the device information for the handler device 101A in the communication information 137 is altered (e.g., spoofed) with number information for the handler VN 131A when completing the communication 104 to the source device 105A. In other words, the communication is completed through the virtual number, rather than the handler device and source device communicating directly, such that sender/handler device information is not shared between the parties.

In one embodiment, the agency service 115 may alter and/or instruct a provider of the virtual number to alter the communication information 137 for completing a communication. For example, the communication information 137 for an initiated call 103 may include caller/recipient information such as a transmitting number of the handler device 101A identified in a caller field and the source VN 135A identified in a recipient field. In another example, the communication information 137 for a message 113 may include sender/recipient information such as a transmitting number of the handler device 101A in a sender field and the source VN 135A in a recipient field.

The agency service 115 may alter the communication information 137 and transmit the altered communication to the provider and/or instruct the provider to alter the communication information 137 such that the communication 103 is completed as desired with sender/caller information corresponding to a specified virtual number (e.g., handler VN 131A) and recipient information corresponding to a specified transmitting number (e.g., of source device 105A). Example altered communication information for completing the communication 104 may spoof the caller/sender information (e.g., the transmitting number of the handler device 101A) with the identified handler VN 131A and specify the source device 105A (e.g., by the identified transmitting number of the source device 105A) as the recipient. Thus, when the communication is completed 104 to the source device 105A (e.g., the source device 105A receives an incoming call or message), the communication appears as if it originated from the handler VN 131A rather than the handler device 101A that initiated 103 the communication.

The spoofing of communication information 137 with information corresponding to the virtual number associated with the device having initiated the communication allows the process to proceed in the reverse direction. For example, as communications are completed through virtual numbers such that the completed communication 104 received at the source device 105A appears to originate from the handler VN 131A, the source device 105A may initiate a subsequent communication 108 to the handler VN 131A, which is completed 109 in a similar fashion such that the completed communication 109 received at the handler device 101A appears as if it originated from the source virtual number 135A rather than the source device 105A. In this manner, a handler and a source can communicate back and forth through the virtual number system with their respective handler device 101A and source device 105B.

Advantageously, because a source device initiated communication to a handler VN that is completed to a handler device appears to originate from a source VN, the source does not require device information for the handler device to communicate with the handler. Similarly, a handler initiated communication to a source VN that is completed to a source device appears to originate from a handler VN, the handler does not require device information for the source device to communicate with the source. Further, because the source can initiate a communication back to the handler through the handler VN, and the handler can initiate a communication back to the source through the source VN, the handler and source can operate their devices in a traditional fashion. In other words, a source VN appears to be the transmitting number of a source device to the handler, and a handler VN appears to be the transmitting number of a handler device to the source, with neither party requiring any knowledge of the implementation of the virtual number system.

In some embodiments, the agency service 115 maintains a communication log which contains an entry for each communication between a source and a handler. For example, the agency service 115 may populate a communication log with an entry for each communication completed 104, 109, 111, 112, through the virtual number system. The communication log entry for a completed communication may also include communication information associated with the initiated communication. In other embodiments, the agency service 115 may determine an entry for each communication between a source and handler and transmits the entry to an agency which maintains the communication log. An example entry for a communication may contain sender/caller and recipient information (e.g., as initiated, completed, or source VN to hander VN), time stamp (e.g., time initiated and/or time delivered), duration for calls, call audio (if any), voicemail recording (if any), transcript of call/voicemail audio (if any), message content, etc. Entry information may be determined wholly or partially by the agency service 115 from connection information received from the provider of the virtual number when a connection is initiated and/or received from the virtual number provider after a communication is completed.

As described above, the agency service 115 provisions and configures the virtual numbers 131, 135 on the network 120 based on information received from an agency. For example, the agency service 115 may store configuration information including associations for the virtual numbers 131, 135 in a mapping table. In some embodiments, the agency service 115 may store associations between handlers and sources to identify whether a given handler and a given source are permitted to communicate with each other. For example, the mapping may store associations between a handler VN and source VN, handler device and source device, or pairing thereof to indicate that a given handler and a given source are permitted to communicate. Accordingly, prior to completing a communication, the agency service 115 may determine whether the handler/source initiating a communication to a virtual number is permitted to communicate with the intended recipient associated with the virtual number. If an association between the handler and source exists, the communication is completed. Otherwise, the communication may be denied. Additionally, the agency service 115 may utilize the associations to notify a party in response to a source-handler communication. For example, the agency service 115 may notify one or more additional handlers permitted to communicate with a source when the source communicates with one of the handlers. In another example, the agency service 115 may notify an administrator that oversees the communications of one or more sources/handlers when a communication of a handler/source the administrator oversees is completed through the system.

The network 120 represents the communication pathway between agencies, agency service 115, the handler devices 101, source devices 105, administrator devices and other entities (not shown). In one embodiment, the network 120 includes standard communications technologies and/or protocols and can include the Internet, public switched telephone network (PSTN), and service provider networks. Oftentimes, these communications technologies and/or protocols carry both PSTN and Internet related data. Thus, the network 120 can include links using technologies such as Ethernet, 802.11, worldwide interoperability for microwave access (WiMAX), 2G/3G/4G mobile communications protocols, worldwide interoperability for PSTN communications, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including analog audio (e.g., for last mile PSTN communications), digital audio and video (e.g., as a file or streaming with Real Time Streaming Protocols), the hypertext markup language (HTML), the extensible markup language (XML), JavaScript, VBScript, FLASH, the portable document format (PDF), etc. In addition, all or some of the data exchanged over the network 120 can be encrypted using conventional encryption technologies such as secure sockets layer (SSL), transport layer security (TLS), virtual private networks (VPNs), Internet Protocol security (IPsec), etc. In another embodiment, the entities on the network 120 can use custom and/or dedicated data communications technologies instead of, or in addition to, the ones described above. For example, some government agencies and the military may operate networks auxiliary to the internet and PSTN.

As used herein, the term "module" refers to computer program instructions and/or other logic used to provide the specified functionality. Thus, a module can be implemented in hardware, firmware, and/or software. In one embodiment, program modules formed of executable computer program instructions are stored on a non-transitory storage device, loaded into memory, and executed by a computer processor as one or more processes to perform the ascribed functionality.

As used herein, the terms "message," "messaging," and "short messaging service (SMS)" each comprise the breadth of messaging services and related technologies or standards used for communicating and transmitting data over the network 120. These technologies and services include SMS messages, multimedia messaging service "MMS" messages, proprietary messaging service messages such as BLACKBERRY messages "BBM" and the like.

Figure 1B:
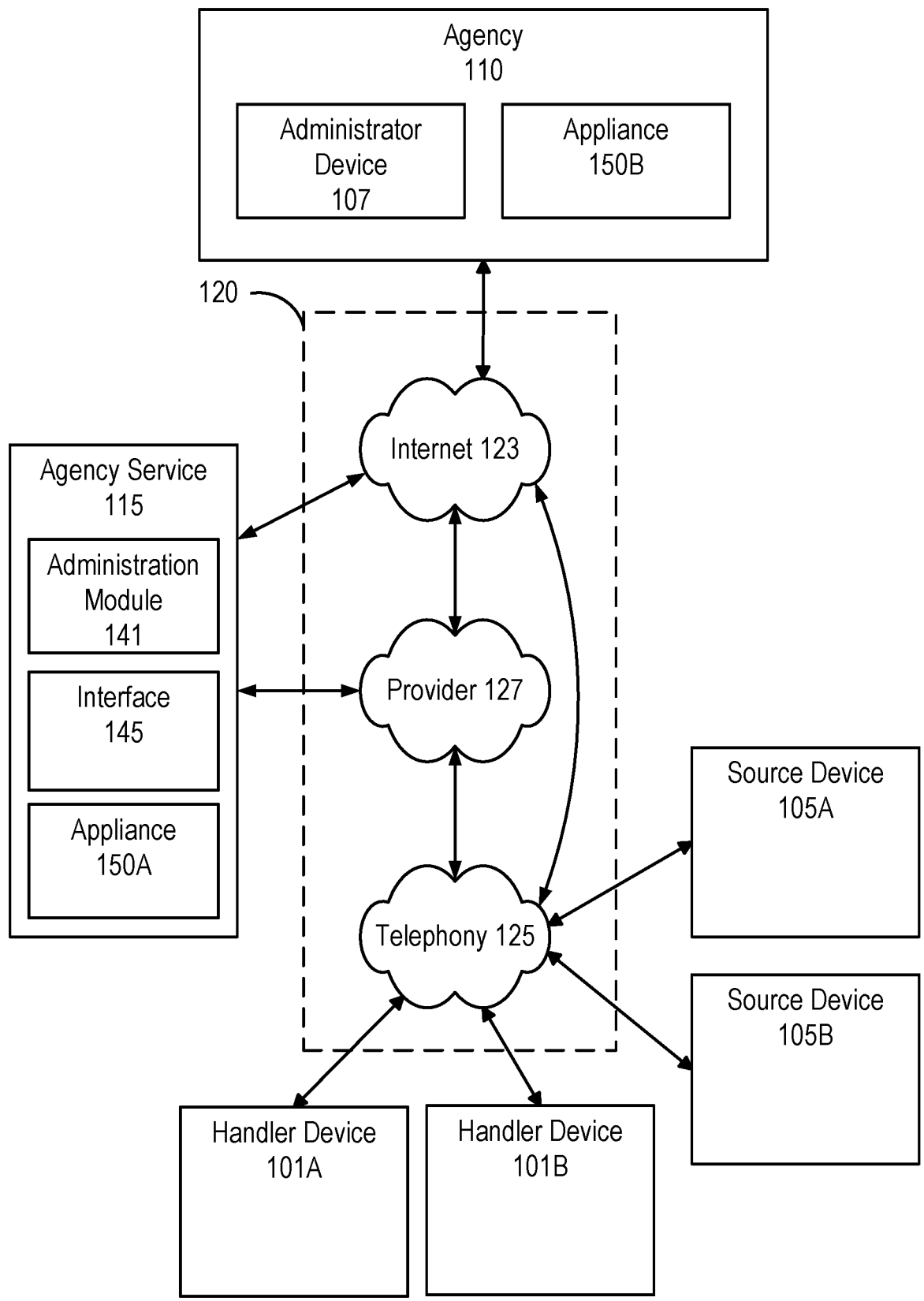

FIG. 1B is a block diagram illustrating an example operating environment of an agency service 115 implementing virtual numbers for intelligence operations in support of an agency 110 according to one example embodiment. As shown, the operating environment includes an agency 110, administrator device 107, handler devices 101, source devices 105 and a network 120 with components such as the internet 123, telephony 125 and provider 127.

Agency 110 represents a collection of servers, desktop, notebook or tablet computers, mobile telephones and related storage mediums used by respective agency personnel for executing applications or modules to communicate with and receive data from the agency service 115 (e.g., via the interface 145) and other entities on the network 120. For example, agency 110 devices may execute a web browser to access a web interface or execute a mobile or desktop application (e.g., including an administration module 141) for communicating with an API, e.g., interface 145, provided by the agency service 115. An agency 110 may also include telephonic and video infrastructure enabling audio and video communicability (e.g., internally and/or over the network 120) using the public switched telephone network ("PTSN"), voice over internet protocol ("VoIP") and video conferencing services for utilizing the virtual number system.

The telephony network 125 may include servers, switches and other hardware and software for implementing, among other protocols and technologies, worldwide interoperability for PSTN communications including land-lines and 2G/3G/4G wireless protocols. The telephony network 125 also provides mobile devices with the capability to transmit and receive data over the internet 123. The telephony network 125 is managed by one or more communication service providers "CSPs" (not shown) that own telephone numbers for use on the PSTN and the CSPs own network (e.g., a wireless network that communicates with the PSTN).

The provider 127 may include servers, switches and other hardware and software for communicating over the network 120 with CSPs and other entities. The provider 127 buys or leases numbers for use on the telephony network 125 from multiple CSPs. The provider 127, in turn, manages numbers provisioned for use by the agency service 115 and the telephony traffic associated with the numbers. In one embodiment, the provider 127 allows the agency service 115 to provision one or more of the numbers as virtual numbers over the network 120.

Typically, a number used on the telephony 125 network directs to a given mobile device, VoIP device or land-line device having an associated number identity characterized by automatic number identification "ANI" information, or caller identification. Virtual numbers, while still operable with the PSTN and CSP networks, are associated with the provider 127 who handles telephony traffic for the number. Because a virtual number does not direct to an end user device, the provider 127 may establish communications through the virtual number between a device calling the virtual number and another device and modify associated communication information for a call (e.g., based on instructions received from the agency service 115) so that the call appears to originate from a different device (or virtual number), record call information such as call audio and caller history (e.g., on a computer readable medium), stream/provide call information for download (e.g., over the network 120), and receive/send message communications through the virtual number and modify associated communication information for a message (e.g., based on instructions received from the agency service 115). Thus, for example, as the virtual numbers are handled by the provider 127, the agency service 115 may modify ANI information (e.g., spoof number information) associated with communications through the virtual numbers.

In addition to provisioning virtual numbers responsive to requests from the agency service 115, the provider 127 communicates notifications and data associated with communication to the virtual numbers to the agency service 115 or other entity such as the agency 110. For example, the provider 127 may notify the agency service 115 of an incoming call or message to the virtual number and provide information about the communication. In turn, provider 127 may receive instructions from the agency service 115 to connect a caller with a given device or redirect a received message to a given device. In a specific example, the agency service 115 may provide instructions for the provider 127 to dial out to a given device in response to a call initiated to a virtual number or send a message to a given device in response to a message transmitted to a virtual number. Thus, the instructions may include recipient information for the provider 127 to complete a communication. Additionally, the agency service 115 may provide instructions specifying spoofed caller/sender information for completing communication such that the communication appears to originate from a device (or another virtual number) different than the one that initiated the communication to the virtual number. For example, the agency service 115 may instruct the provider 127 to replace device information for the device that initiated the communication with number information for a virtual number associated with the device. The provider 127 may also receive instructions to stop/start recordings of calls placed to the virtual number and interface with a transcription service to transcribe call audio. In turn, the provider 127 can transmit recording and transcript information about completed communications to the agency service 115 or other entity on the network 120. Additionally, the provider 127 may transmit other information about completed communications such as call duration, message delivery time, etc. to the agency service 115 and/or the agency service 115 may request the information.

The provider 127 can receive instructions for managing a virtual number and providing information to the agency service 115 as part of the provisioning process, prior to an initiated communication or in real-time from the agency service 115 in response to initiated communications to the virtual number in order to complete the communication. In some embodiments, the provider 127 communicates directly with the agency 110 to transmit notifications and data or receive instructions. Additionally, the provider 127 itself may function as a CSP and vice versa.

The agency service 115 receives requests for provisioning and mapping virtual numbers from the agency 110, administrator device 107, and/or other authorized device. The requests can include number information for provisioning virtual numbers such as an area code (e.g., 555), country code (e.g., +44) and/or associated CSP. In turn, the agency service 115 queries the provider 127 for available virtual numbers matching the request and may return the matching virtual numbers to the requesting entity. The agency service 115 subsequently receives a selection of virtual numbers from the requesting entity or automatically selects a virtual number and claims the virtual numbers from the provider 127.

When a virtual number is no longer needed by the agency 110, the agency service 115 obtains any audio recordings, call logs or messages associated with the virtual number and releases the number back to the provider 127.

The request may also include mapping information for configuring claimed virtual number function and associations for the virtual number in a mapping table. Depending on the desired configuration, the mapping information may specify whether a virtual number is a handler VN or source VN and include the transmitting number of a handler device 101 or source device 105 to associate with the virtual number. One example mapping request may specify a claimed virtual number for configuration as a handler VN and specify the transmitting number of a given handler device (e.g., handler device 101A). Similarly, one example mapping request may specify a claimed virtual number for configuration as a source VN and specify the transmitting number of a given source device (e.g., source device 101A). The agency service 115 stores the configuration of the specified virtual number in association with the transmitting number of the specified telephonic device in the mapping table.

Additionally, the agency service 115 may receive a request to associate a handler with a source to permit the handler and the source to communicate through the virtual number system. For example, the request may specify a handler VN or transmitting number of a handler device to associate with a source VN or transmitting number of a source device. In some embodiments, the handler VN and transmitting number of the handler device may be associated with a handler ID, and similarly, the source VN and transmitting number of the source device may be associated with a source ID. In turn, a handler ID may be associated with a source ID within the mapping table and/or in a separate table. In some embodiments, source VNs and handler VNs function as IDs. A source/handler ID may be an alphanumerical ID, name or user name of the source/handler, and/or combination thereof. In either instance, the association between the handler and the source indicates that the handler and source are permitted to communicate. Additionally, the associations of a handler with one or more sources may permit the handler to review past communications of the one or more sources. In some embodiments, the request may specify one or more handlers/sources an administrator oversees to permit the administrator to review the communications of the one or more handlers/sources. In some embodiments, the request may further specify whether a handler/administrator should be notified of new communications with a given source.

In practice, agency service 115 consults the mapping table to automatically identify a telephonic device initiating a communication to a virtual number as either a handler device or source device and the virtual number as either a handler VN or source VN. Further, the agency service 115 consults the associations stored in the mapping table to identify a handler VN or a source VN associated with the telephonic device initiating the communication to the virtual number and a handler device or a source device associated with the virtual number. From the information determined from the mapping table, the agency service 115 may instruct the provider 127 to complete the communication. Additionally, the agency service 115 may consult the associations stored in the mapping table to identify whether the source and the handler are permitted to communicate prior to instructing the provider 127 to complete the communication.

In some embodiments, the agency service 115 provides an administration module 141 to the administrator device 107 and/or handler device 107. The administration module 141, when executed on a device, may provide a user interface or status dashboard with options for configuring and accessing information within the virtual number system. The administrator device 107 may utilize the administration module 141 to perform administrative functions through the interface 145 of the agency service 115. For example, the administration module 141 may enable the administrator device 107 to request and configure virtual numbers as handler/source VNs, provide device information for handler/source devices for association, respectively, with handler/source VNs, and specify associations that permit a handler to communicate with a source. The administrator device 107 and/or handler device 101 may also utilize the administration module 141 to access communication logs. In some embodiments, a hander device 101 is also an administrator device 107 and vice verse. Embodiments of the administration module 141 are discussed in more detail with reference to FIG. 2.

In some embodiments, the agency service 115 includes an interface 145 for receiving data from and providing received data to various entities over the network 120. For example, the interface 145 may receive requests to provision and configure virtual numbers from an administrator device 107 and review mapping table information. Additionally, the interface may 145 provide communication logs to the agency 110, administrator device 107, and/or handler device 101.

In one embodiment, the agency 110 includes an appliance 150B for storing communication logs collected by the agency service 115 and/or provider 127 for handler-source communications. The appliance 150B may utilize the interface 145 provided by the agency service 115 for updating stored data or receive data directly from the provider 127. Additionally, the appliance 150B may receive audio recorded on a virtual number and associated transcripts from the provider 127 or agency service 115. One example embodiment of the appliance 150B also includes its own interface (not shown) that enables administrator devices 107 and/or handler device 101 to access communication logs stored on the appliance. Interfaces provided by the agency service 115 or appliance 150B may also be accessible via a web browser for streaming or downloading data and include the same or similar options.

Additionally, the appliance 150B and agency service 115 may communicate to intermittently update collected data and records at defined intervals or in response to notifications to download data. During the intervals or notification periods, the agency service 115 may process and store data for communication log entries (e.g., on a local appliance 150A) until the data is transferred to the agency appliance 150B. In some embodiments, the agency service 115 maintains a persistent connection with the appliance 150B to facilitate transfer of real-time data associated with handler-source communications.

In one embodiment, the agency service 115 insures that it, and the provider 127, do not possess collected communication data beyond the time needed to facilitate transfer to the agency appliance 150B. However, in mission critical situations, agency 110 personnel and handlers cannot rely only on the availability of the appliance 150B for storing and maintaining collected data. Consequently, if the appliance 150B is unable to take possession of the collected data or go offline during transfer, the agency service 115 and/or the provider 127 may maintain possession of the collected data until the appliance 150B is functioning. Furthermore, the agency service 115 and/or provider 127 may determine whether checksums, hashes or sizes of transferred data match the appliance's 150B version prior to deleting stored data.

In some embodiments, the agency service 115 maintains an appliance 150A instead of, or in addition to, the agency 110. In such cases, the appliance 150A may exist as a dedicated piece of hardware or remote storage. Alternatively, embodiments of an appliance 150A, or 150B may be implemented in a cloud computing and storage stack accessible on the network 120.

Administration Module

Figure 2:
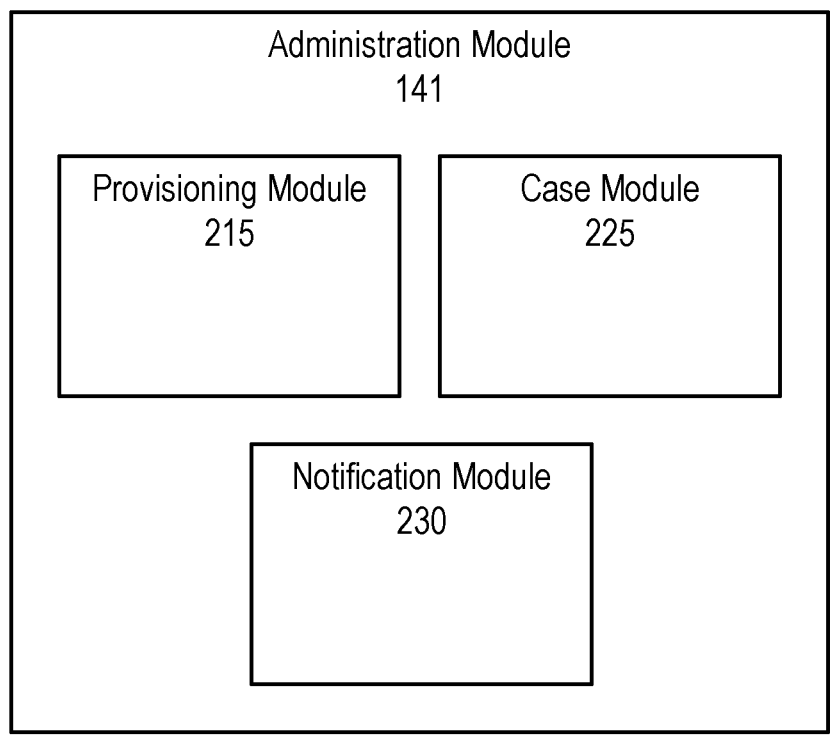
FIG. 2 is a block diagram illustrating an example administration module according to one example embodiment.

FIG. 2 is a block diagram illustrating an example administration module 141 according to one example embodiment. As mentioned above, the administration module 141 may be downloaded from the agency service 115 to configure and access data via the agency service interface 145. As shown in FIG. 2, the administration module 141 itself includes multiple modules. In the embodiment shown in FIG. 2, the administration module 141 includes a provisioning module 215, case module 225, and notification module 230. In some embodiments, the functions are distributed among the modules in a different manner than described herein. Other embodiments have additional and/or other modules.

The provisioning module 215 interfaces with the provider 127 or agency service 115 to provision virtual numbers and configure virtual numbers. Alternatively, a web browser may be used to access the agency interface 145 to perform these functions. For example, the web browser or provisioning module 215 may present an administrator with a list of all virtual numbers provisioned for a given agency account, the configuration of the virtual number (e.g., as a handler VN or source VN), and device information for an associated telephonic device (e.g., handler device or source device). Additionally, the sources a handler is permitted to communicate with, and vice versa, may be listed and permissions (e.g., source-handler association) may be set to permit handlers to communicate with different sources and vice versa. Thus, the administrator may specify information for provisioning and modifying mapping and function of the virtual numbers within the provisioning module 215 which may transmit and receive information with an interface of an agency service to provision and configure virtual numbers for source-handler communications.

In some embodiments, the case module 225 interfaces with the provider 127, agency services 115 or appliance 150 to retrieve activities associated with a given handler or source (e.g., by source/handler ID, source/handler VN, or source/handler device information). Alternatively, a web browser may be used to access the agency interface 145 to perform these functions. For example, the case module 225 or web browser may present an interface with handler/source VNs (ID or other) that an administrator or handler may select, for example, to view associated communication logs on their device.

In some embodiments, the notification module 230 receives push notifications from the agency service 115, e.g., via the interface 145 and/or appliance (e.g., appliance 150B or 150A). The push notifications may notify an administrator or handler when new log entries are added and/or updated in a communications log.

Additionally, some or all of the features provided by the administration module 141 may require the user to enter a specified key-in (e.g., button press combination, password or other personal identification) prior to operation or launch. Thus, for example, access to the provisioning module 215 may be limited to administrators and handlers may only access communication logs via the case module 225 for sources they are permitted to communicate with.

Virtual Number Provisioning and Mapping

Figure 3A:
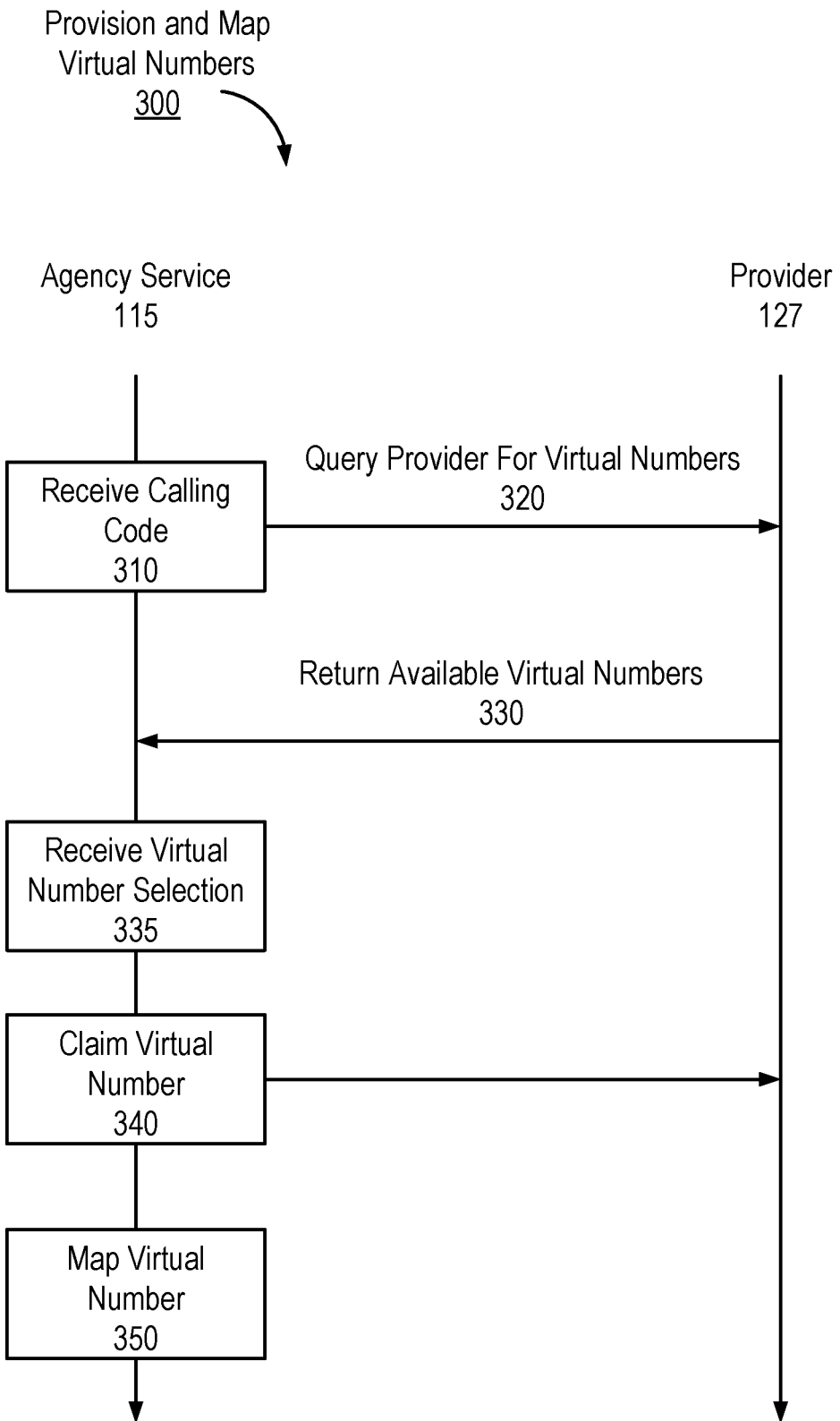
FIG. 3A is an interaction diagram illustrating a method for provisioning and mapping virtual numbers for intelligence operations according to one example embodiment.

FIG. 3A is an interaction diagram illustrating a method for provisioning and mapping virtual numbers 300 for intelligence operations according to one example embodiment. Initially, the agency service 115 receives 310 a request for provisioning 300 a virtual number, such as from an administrator device 107, provided web interface or other authorized entity. The request 310 may specify a calling code which can include an area code and country code where the provisioned virtual number will be operated or, alternatively, the agency service 115 may determine a calling code based on the requesting entity (e.g., a UK calling code in response to a UK Agency request or a US calling code in response to a US Agency request).

The agency service 115 queries 320 the provider for virtual numbers matching the calling code. The provider 127 returns 330 a list of available virtual numbers to the agency service 115 which, in turn, may either automatically select a virtual number or transmit the available virtual numbers for display to the requestor. The agency service 115 receives 335 one or more virtual number selections or automatically selects a specified number of virtual numbers and claims 340 each selected virtual number from the provider 127. The agency service 115 subsequently stores the claimed virtual numbers for use by the requestor.

With one or more virtual numbers claimed, the agency service 115 may receive mapping requests to configure virtual numbers and their associations within a mapping table and, in turn, maps 350 the virtual numbers responsive to information in the mapping request. For example, the requestor may be prompted to indicate whether the virtual number is a handler VN or a source VN and provide the transmitting number of a telephonic device for association with the virtual number, e.g., the transmitting number of a handler device for association with a handler VN or the transmitting number of a source device for associated with a source VN. The agency service 115 stores the virtual number configuration and the transmitting number of the associated telephonic device in the mapping table. Additionally, a mapping request may indicate one or more sources a handler is permitted to communicate with or one or more handlers a source is permitted to communicate with through the system. In turn, the agency service 115 maps a given hander to a given source, which may be an association of a handler VN mapped 350 to a source VN. The requestor may modify mappings at any time.

Figure 3B:
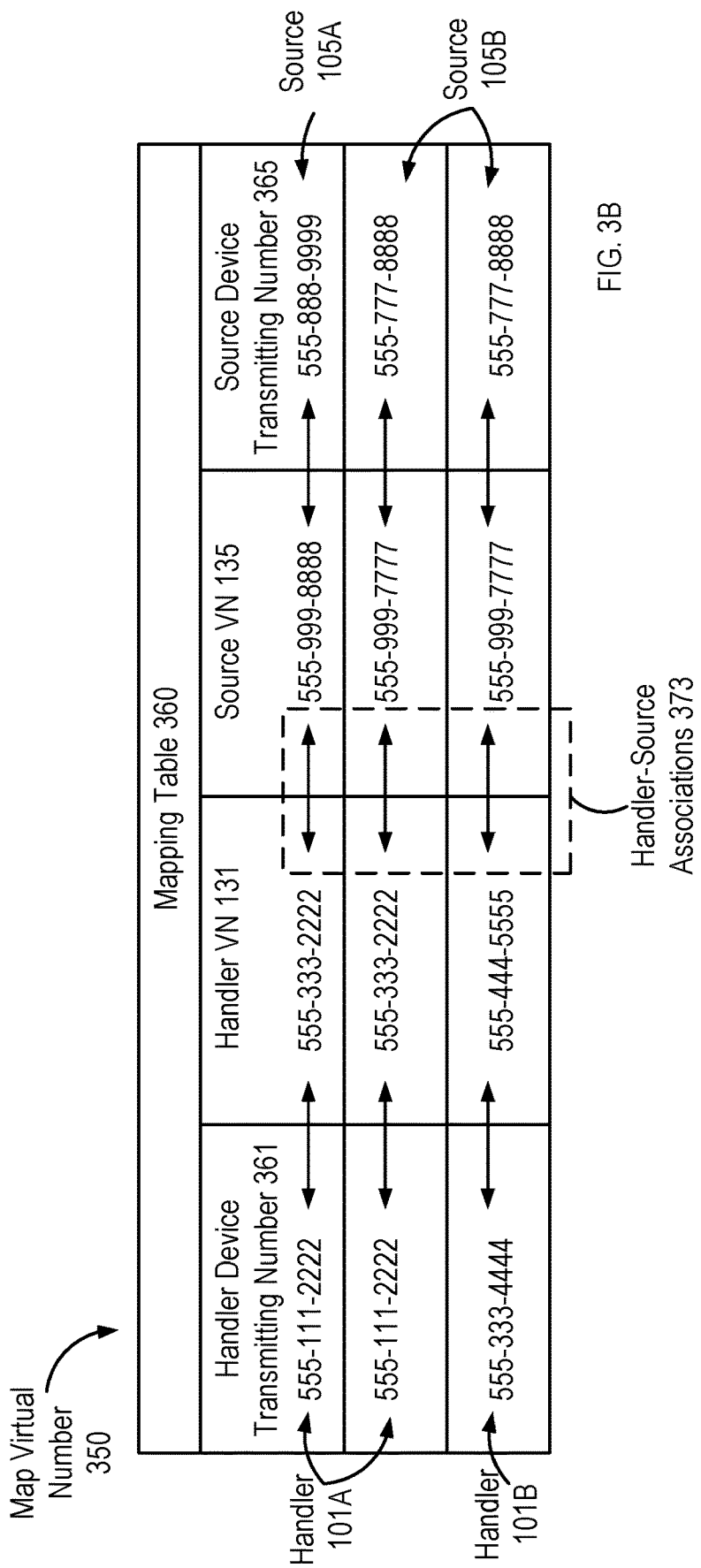
FIG. 3B is a table illustrating an example of virtual number mapping for handler-source communications according to one example embodiment.

FIG. 3B is a table illustrating an example embodiment of virtual number mapping 350 for handler-source communications according to one example embodiment. As shown, mapping table 360 includes a number of handler device transmitting numbers 361 mapped to corresponding handler VNs 131 and a number of source device transmitting numbers 365 mapped to corresponding source VNs 135.

Additionally shown is an embodiment of handler-source associations 373 stored within the mapping table 360. As shown, example handler-source associations 373 are formed between handler 101A and source 105A, handler 101A and source 105B, and handler 101B and source 105B.

When the agency service 115 receives communication information for a communication initiated to a virtual number by a telephonic device, the communication information includes the virtual number and the transmitting number of the telephonic device. Accordingly, the agency service 115 determines whether the virtual number matches a source VN or handler VN stored in the mapping table 360 and determines whether the transmitting number of the telephonic device matches the transmitting number of a source device or handler device. If the virtual number does not match any source VN or handler VN stored in the mapping table, the agency service 115 may deny the communication. Similarly, if the transmitting number of the telephonic device does not match any transmitting number of a handler device or source device stored in the mapping table, the agency service may deny the communication. In some embodiments, if the virtual number matches a source VN, the agency service 115 determines whether the transmitting number of the telephonic device matches that of a handler device; or if the virtual number matches a handler VN that the transmitting number of the telephonic device matches that of a source device in order to restrict use of the virtual number system strictly to source-handler communications. In some embodiments, if the virtual number matches a source VN and the transmitting number of the telephonic device matches that of a handler device; or if the virtual number matches a handler VN and the transmitting number of the telephonic device matches that of a source device, the agency service 115 determines whether an association 373 exists between the handler and the source. If the association 373 exists, the handler and the source are permitted to communicate through the system. If an association 373 does not exist between the handler and the source (e.g., handler 101B and source 101A), the agency service 115 may deny the communication in order to prevent unauthorized source-handler communications, even though the source and the handler have access to the system.

Example Handler Initiated Communication

Figure 4:
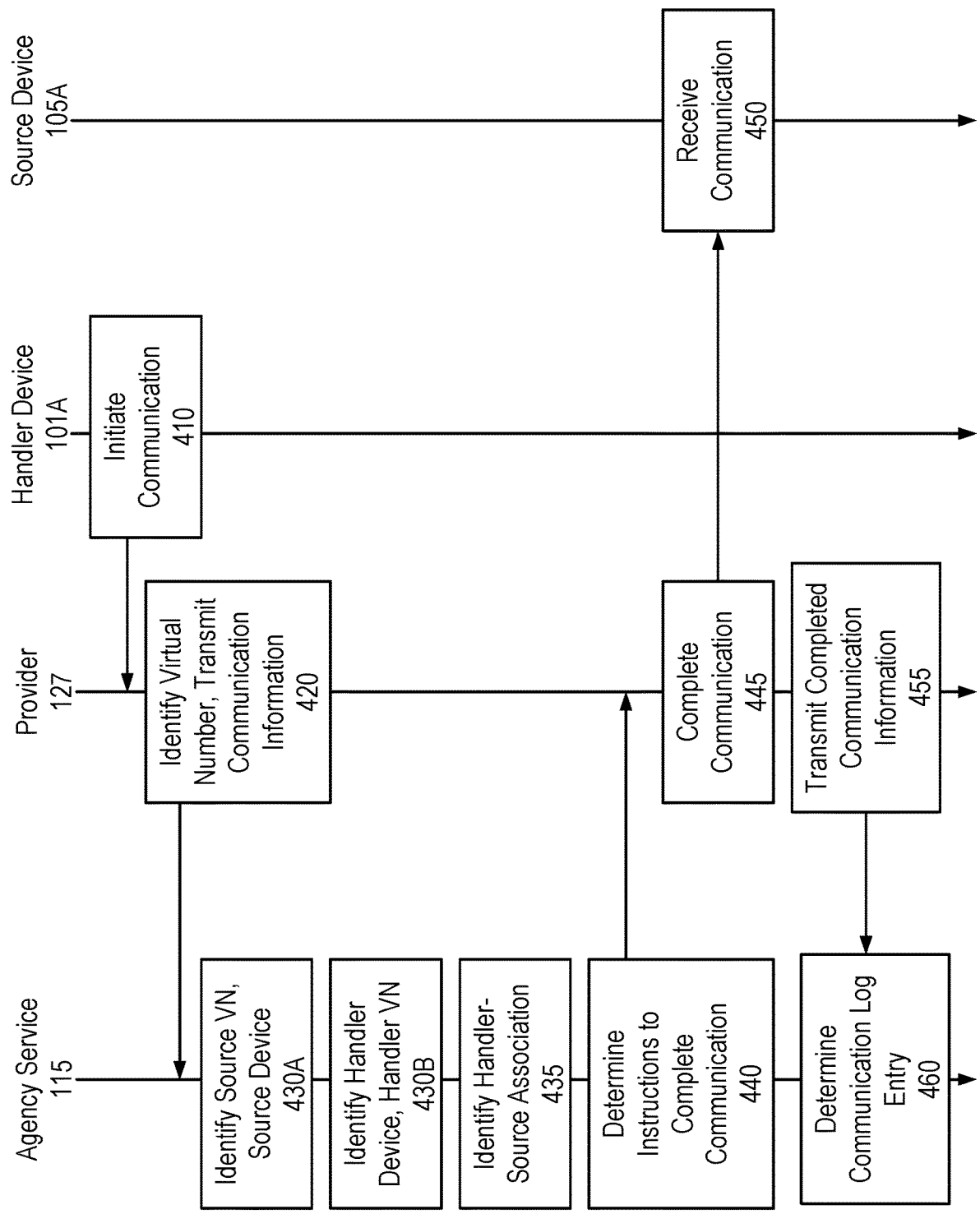
FIG. 4 is an interaction diagram illustrating a method for source-handler communications initiated by a handler device according to one example embodiment.

An example process for completing a handler initiated communication utilizing the mapping table 360 is described according to the illustrated embodiment in FIG. 3B and with reference to FIG. 4. FIG. 4 is an interaction diagram illustrating a method for source-handler communications initiated by a handler device according to one example embodiment.

FIG. 4 illustrates handler device 101A initiating a communication 410 to a virtual number. The provider 127 of the virtual number identifies the initiated communication 410 is to a virtual number provisioned by the agency service 115 and transmits 420 communication information to the agency service 115.

As described above, the agency service 115 receives communication information for an initiated communication to a virtual number by a telephonic device. Referring to FIG. 3B, and considering the example where handler 101A initiated the communication to a source VN 135 in order to communicate with source 105A. The communication information for the initiated communication by the handler's telephonic device (e.g., handler device 101A) includes the virtual number (e.g., 555-999-8888 of source 105A) and the transmitting number of the telephonic device (e.g., 555-111-2222 of handler 101A).

Based on the received communication information, the agency service 115 identifies the source VN 135 of source 105A, 555-999-8888, as matching the virtual number to which the communication was initiated. In turn, the agency service 115 may identify the source device transmitting number 365 of source 105A, 555-888-9999, that is associated with the identified source VN 135, 555-999-8888, of source 105A.

Additionally, based on the communication information, the agency service 115 identifies the handler device transmitting number 361 of handler 101A, 555-111-2222, as matching the transmitting number of the telephonic device that initiated the communication. In turn, the agency service 115 may identify the handler VN 131 of handler 101A, 555-333-2222, that is associated with the identified handler device transmitting number 361, 555-111-2222 of handler 101A.

In some embodiments, the agency service 115 identifies whether a handler-source association 373 exists between the handler 101A and the source 105A to permit completion of the communication. In example mapping table 360, the agency service 115 determines that the handler VN 131 of handler 101A, 555-333-2222, is associated with the source VN 135 of source 105A, 555-999-8888, and thus determines that the initiated communication may be completed.

Referring back to FIG. 4, the agency service 115 identifies 430A the source VN and the associated source device and identifies 430B the handler device and the associated handler VN. Additionally, the agency service 115 may identify 435 a handler-source association between the handler 101A and source 105A to determine whether permission exists for the initiated communication to be completed. The agency service 115 determines instructions 440 to complete the (permitted) communication.

Turning back to FIG. 3B, the agency service 115 has identified the handler device 101A that initiated 410 the communication and the associated handler VN 131. Additionally, the agency service 115 has identified the source VN 135 the communication was initiated 410 to and the associated source device 105A. To complete the communication, the agency service 115 determines instructions based on the identified information in the mapping table for the handler 101A and the source 105A. Specifically, the agency service 115 may modify the received communication information and transmit the modified communication information to instruct the provider 127 for completing the communication. For example, the agency service 115 may determine instructions 440 modify caller/sender information to replace the handler device transmitting number 361 of handler 101A, 555-111-2222, with the associated handler VN, 555-333-2222, and modify recipient information to replace the source VN 135 of source 101A, 555-999-8888, with the associated source device transmitting number, 555-888-9999. In turn, the provider 127 completes the communication based on the modified communication information such that when the source device 105A receives the communication it appears to originate from the handler VN, 555-333-2222.

Referring again to FIG. 4, the provider receives the instructions 440 determined by the agency service 115 for completing the communication. In turn, the provider 127 completes 445 the communication to the source device 105A based on the received instructions such that the communication received 450 at the source device 105A appears to originate from the identified handler VN (step 430B) associated with the transmitting number of the handler device 101A rather than the handler device 101A.

Once the communication is completed, e.g., a call ends, or a message is delivered, the provider 127 transmits 455 information about the completed communication to the agency service 115. The transmitted 455 information may include, for example, call duration, call end time, call audio, voicemail audio, message delivery time stamp, etc. as applicable. The agency service 115 determines a communication log entry from received information about the communication, e.g., based on communication information received from step 420 for initiated communications and/or completed communication information from step 455. The agency service 115, in turn, may transmit the communication log entry to an agency associated with the handler.

Example Source Initiated Communication

Figure 5:
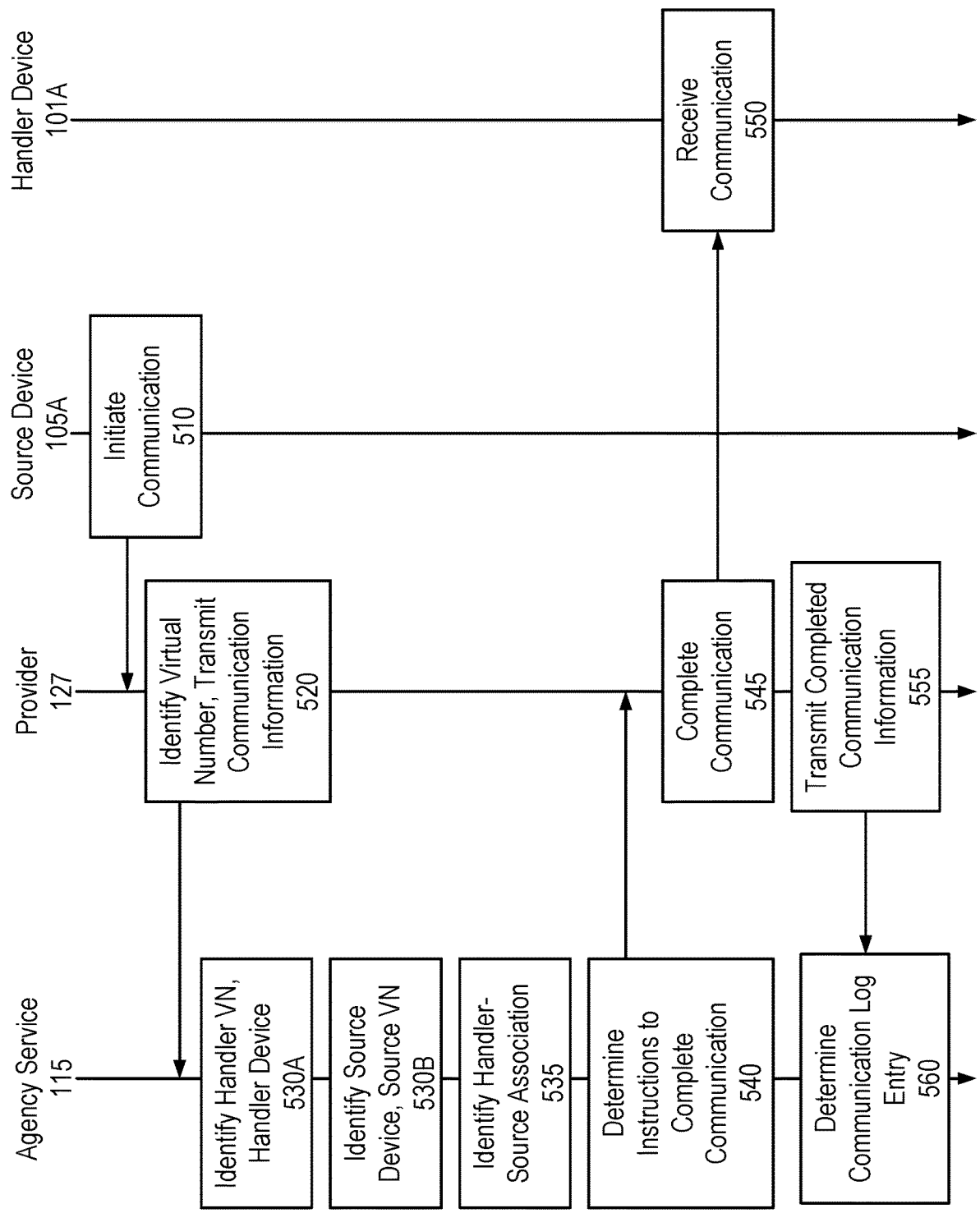
FIG. 5 is an interaction diagram illustrating a method for source-handler communications initiated by a source device according to one example embodiment.

An example process for completing a source initiated communication utilizing the mapping table 360 is described according to the illustrated embodiment in FIG. 3B and with reference to FIG. 5. FIG. 5 is an interaction diagram illustrating a method for source-handler communications initiated by a source device according to one example embodiment.

FIG. 5 illustrates source device 101A initiating a communication 510 to a virtual number. The provider 127 of the virtual number identifies the initiated communication 510 is to a virtual number and transmits 520 communication information to the agency service 115.

As described above, the agency service 115 receives communication information for an initiated communication to a virtual number by a telephonic device. Referring to FIG. 3B, and considering the example where source 105A initiated the communication to a handler VN 131 in order to communicate with handler 101A. The communication information for the initiated communication by the source's telephonic device (e.g., source device 105A) includes the virtual number (e.g., 555-333-2222 of handler 101A) and the transmitting number of the telephonic device (e.g., 555-888-9999 of source 105A).

Based on the received communication information, the agency service 115 identifies the handler VN 131 of handler 101A, 555-333-2222, as matching the virtual number to which the communication was initiated. In turn, the agency service 115 may identify the handler device transmitting number 361 of handler 101A, 555-111-2222, that is associated with the identified handler VN of handler 101A.

Additionally, based on the communication information, the agency service 115 identifies the source device transmitting number 365 of source 105A, 555-888-9999, as matching the transmitting number of the telephonic device that initiated the communication. In turn, the agency service 115 may identify the source VN 135 of source 105A, 555-999-8888, that is associated with the identified source device transmitting number 365, 555-888-9999, of source 105A.

In some embodiments, the agency service 115 identifies whether a handler-source association 373 exists between the handler 101A and the source 105A permitting their communication. In example mapping table 360, the agency service 115 determines that the handler VN 131 of handler 101A, 555-333-2222, is associated with the source VN 135 of source 105A, 555-999-8888, and thus determines that the initiated communication may be completed.

Referring back to FIG. 5, the agency service 115 identifies 530A the handler VN and the associated handler device and identifies 530B the source device and the associated source VN. Additionally, the agency service 115 may identify 535 a handler-source association between the handler 101A and source 105A to determine whether permission exists for the initiated communication to be completed. The agency service 115 determines instructions 540 to complete the (permitted) communication.

Turning back to FIG. 3B, the agency service 115 has identified the source device 105A that initiated the communication and the associated source VN 135. Additionally, the agency service 115 has identified the hander VN 131 the communication was initiated to and the associated handler device 101A. To complete the communication, the agency service 115 determines instructions based on the identified information in the mapping table for the handler 101A and the source 105A. Specifically, the agency service 115 may modify the received communication information and transmit the modified communication information to instruct the provider 127 for completing the communication. For example, the agency service 115 may determine instructions 540 to modify caller/sender information to replace the source device transmitting number 365 of source 105A, 555-888-9999, with the associated source VN, 555-999-8888, and modify recipient information to replace the handler VN 131 of handler 105A, 555-333-2222, with the associated handler device transmitting number, 555-111-2222. In turn, the provider 127 completes the communication based on the modified communication information such that when the handler device 101A receives the communication it appears to originate from the source VN, 555-999-8888.

Referring again to FIG. 5, the provider 127 receives the instructions 540 determined by the agency service 115 for completing the communication. In turn, the provider 127 completes 545 the communication to the handler device 101A based on the received instructions such that the communication received 550 at the handler device 101A appears to originate from the identified source VN (step 530B) rather than the source device 105A.

Once the communication is completed, e.g., a call ends, or a message is delivered, the provider 127 transmits 555 information about the completed communication to the agency service 115. The transmitted 555 information may include, for example, call duration, call end time, call audio, voicemail audio, message delivery time stamp, etc. as applicable. The agency service 115 determines a communication log entry from received information about the communication, e.g., based on communication information received from step 520 for initiated communications and/or completed communication information from step 555. The agency service 115, in turn, may transmit the communication log entry to an agency associated with the handler.

Example System Components

Figure 6:
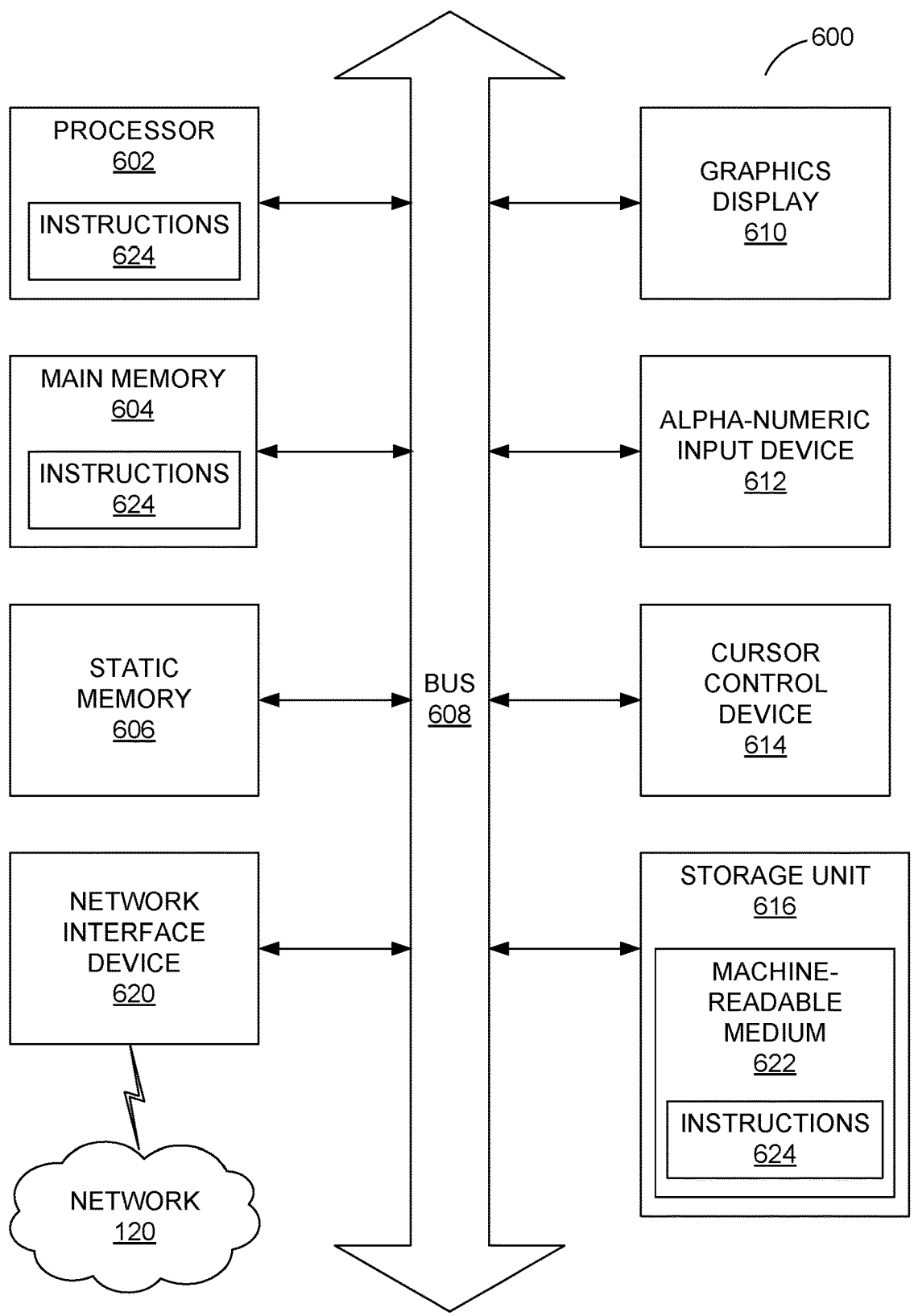
FIG. 6 illustrates an example architecture of a computing device, components of the architecture can correspond to components in embodiments of devices and/or collections of devices such as hander device, source device, agency service, agency, administrator device, provider, etc. described herein.

FIG. 6 illustrates an example architecture of a computing device. Portions or all of the components of the architecture may correspond to components in embodiments of computing devices and/or collections of devices such as hander device, source device, agency service, agency, administrator device, provider, etc. As such, FIG. 6 illustrates components able to read instructions from a machine-readable medium and execute them on one or more processors (or controllers) to implement embodiments of the disclosed system for implementing virtual numbers in support of undercover operations, according to one example embodiment. For example, devices 101, 105, agency service 115, agency 110, appliances 150 and administrator device 107, among other entities described herein such as devices utilized in provider 127, internet 123, and telephony 125 networks (collectively network 120) may include one or more of the components illustrated in FIG. 6. Specifically, FIG. 6 shows a diagrammatic representation of a machine in the example form of a computer system 600 within which instructions 624 (e.g., software or program code) for causing the machine to perform any one or more of the methodologies discussed herein may be executed. In some embodiments, the instructions 624 are stored within computer program modules. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, an internet of things (IoT) device, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processors 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or the like. The computer system 600 may also include alphanumeric input device 612 (e.g., a keyboard—hardware and/or software based), a cursor control device 614 (e.g., touch screen response, a mouse, a trackball, a joystick, a motion sensor, or other pointing instrument), a storage unit 616, and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 120 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer based method for establishing source-handler communications, comprising:
   receiving communication information in response to a communication initiated from a first telephonic device to a first virtual number, the communication information including recipient information corresponding to the first virtual number and initiator information corresponding to the first telephonic device;
   identifying, in a mapping table, a second virtual number associated with the first telephonic device;
   identifying, in the mapping table, a second telephonic device associated with the first virtual number;
   identifying, in the mapping table, an association between the first virtual number and the second virtual number, the association indicating a permission for a handler associated with the first virtual number to communicate with a source associated with the second virtual number;
   responsive to identifying the association between the first virtual number and the second virtual number, determining instructions for completing the communication, the instructions:
     specifying new recipient information corresponding to the second telephonic device associated with the first virtual number, and
     specifying new initiator information corresponding to the second virtual number associated with the first telephonic device; and
   transmitting the instructions to complete the communication based on the new recipient information and the new initiator information, the second telephonic device receiving the communication responsive to the new recipient information specifying the second telephonic device, and the communication appearing to originate from the second virtual number responsive to the new initiator information specifying the second virtual number.

2. The method of claim 1, wherein the initiator information corresponding to the first telephonic device is a transmitting number of the first telephonic device.

3. The method of claim 2, wherein identifying, in the mapping table, the second virtual number associated with the first telephonic device comprises:
   identifying, in the mapping table, the transmitting number of the first telephonic device; and
   identifying the second virtual number in the mapping table based on an association of the transmitting number of the first telephonic device with the second virtual number.

4. The method of claim 1, wherein identifying, in the mapping table, the second telephonic device associated with the first virtual number comprises:
   identifying, in the mapping table, the first virtual number; and
   identifying the second telephonic device in the mapping table based on an association of the first virtual number with the second telephonic device.

5. The method of claim 4, wherein the identifying the second telephonic device comprises identifying a transmitting number of the second telephonic device associated with the first virtual number in the mapping table, the specifying of the new recipient information corresponding to the second telephonic device associated with the first virtual number comprising specifying the transmitting number of the second telephonic device.

6. The method of claim 1, further comprising receiving second information corresponding to the completed communication and generating a log entry corresponding to the communication based on the first information received corresponding to the initiated communication and the second information received corresponding to the completed communication.

7. The method of claim 1, wherein
   the first telephonic device is a source device and the second virtual number is a source virtual number, the source device associated with the source virtual number in the mapping table,
   the second telephonic device is a handler device and the first virtual number is a handler virtual number, the handler device associated with the handler virtual number in the mapping table, and the handler device receiving the communication appearing to originate from the source virtual number instead of the source device.

8. The method of claim 1, wherein
the first telephonic device is a handler device and the second virtual number is a handler virtual number, the handler device associated with the handler virtual number in the mapping table,
the second telephonic is a source device and the first virtual number is a source virtual number, the source device associated with the source virtual number in the mapping table, and
the source device receiving the communication appearing to originate from the handler virtual number instead of the handler device.

9. A computer based method for establishing source-handler communications, comprising:
receiving communication information in response to a communication initiated from a first telephonic device to a first virtual number, the communication information including recipient information corresponding to the first virtual number and initiator information corresponding to the first telephonic device;
identifying, in a mapping table, a second virtual number associated with the first telephonic device;
identifying, in the mapping table, a second telephonic device associated with the first virtual number;
identifying, in the mapping table, an association between the first virtual number and the second virtual number, the association indicating a permission for a source associated with the first virtual number to communicate with a handler associated with the second virtual number; and
responsive to identifying the association between the first virtual number and the second virtual number, determining instructions for completing the communication, the instructions:
specifying new recipient information corresponding to the second telephonic device associated with the first virtual number, and
specifying new initiator information corresponding to the second virtual number associated with the first telephonic device; and
transmitting the instructions to complete the communication based on the new recipient information and the new initiator information, the second telephonic device receiving the communication responsive to the new recipient information specifying the second telephonic device, and the communication appearing to originate from the second virtual number responsive to the new initiator information specifying the second virtual number.

10. A server system comprising at least one processor and a non-transitory computer-readable storage medium storing computer program code for establishing source-handler communications, the computer program code when executed by the at least one processor causing the server system to perform steps to:
receive communication information in response to a communication initiated from a first telephonic device to a first virtual number, the communication information including recipient information corresponding to the first virtual number and initiator information corresponding to the first telephonic device;
identify, in a mapping table, a second virtual number associated with the first telephonic device;
identify, in the mapping table, a second telephonic device associated with the first virtual number;
identify, in the mapping table, an association between the first virtual number and the second virtual number, the association indicating a permission for a handler associated with the first virtual number to communicate with a source associated with the second virtual number;
responsive to identifying the association between the first virtual number and the second virtual number, determine instructions for completing the communication, the instructions:
specifying new recipient information corresponding to the second telephonic device associated with the first virtual number, and
specifying new initiator information corresponding to the second virtual number associated with the first telephonic device; and
transmit the instructions to complete the communication based on the new recipient information and the new initiator information, the second telephonic device receiving the communication responsive to the new recipient information specifying the second telephonic device, and the communication appearing to originate from the second virtual number responsive to the new initiator information specifying the second virtual number.

11. The server system of claim 10, wherein the initiator information corresponding to the first telephonic device is a transmitting number of the first telephonic device.

12. The server system of claim 11, wherein identifying, in the mapping table, the second virtual number associated with the first telephonic device comprises:
identifying, in the mapping table, the transmitting number of the first telephonic device; and
identifying the second virtual number in the mapping table based on an association of the transmitting number of the first telephonic device with the second virtual number.

13. The server system of claim 10, wherein identifying, in the mapping table, the second telephonic device associated with the first virtual number comprises:
identifying, in the mapping table, the first virtual number; and
identifying the second telephonic device in the mapping table based on an association of the first virtual number with the second telephonic device.

14. The server system of claim 13, wherein the identifying the second telephonic device comprises identifying a transmitting number of the second telephonic device associated with the first virtual number in the mapping table, the specifying of the new recipient information corresponding to the second telephonic device associated with the first virtual number comprising specifying the transmitting number of the second telephonic device.

15. The server system of claim 10, further comprising receiving second information corresponding to the completed communication and generating a log entry corresponding to the communication based on the first information received corresponding to the initiated communication and the second information received corresponding to the completed communication.

16. The server system of claim 10, wherein
the first telephonic device is a source device and the second virtual number is a source virtual number, the source device associated with the source virtual number in the mapping table, the second telephonic is a handler device and the first virtual number is a handler virtual number, the handler device associated with the handler virtual number in the mapping table, and the handler device receiving the communication appearing to originate from the source virtual number instead of the source device.

17. The server system of claim 10, wherein the first telephonic device is a handler device and the second virtual number is a handler virtual number, the handler device associated with the handler virtual number in the mapping table, the second telephonic is a source device and the first virtual number is a source virtual number, the source device associated with the source virtual number in the mapping table, and the source device receiving the communication appearing to originate from the handler virtual number instead of the handler device.

* * * * *